United States Patent [19]

Jasch et al.

[11] 4,199,906
[45] Apr. 29, 1980

[54] COOLING TOWER

[75] Inventors: Erich Jasch, Seeheim; Paul Kasper, St. Wendel, both of Fed. Rep. of Germany

[73] Assignee: Fried. Krupp Gesellschaft mit beschränkter Haftung, Essen, Fed. Rep. of Germany

[21] Appl. No.: 957,840

[22] Filed: Nov. 6, 1978

[30] Foreign Application Priority Data

Nov. 4, 1977 [DE] Fed. Rep. of Germany ....... 2749349

[51] Int. Cl.² .......................... E04B 1/35; E05H 5/12; E04H 12/00
[52] U.S. Cl. .......................................... 52/63; 52/80; 52/83; 52/745; 261/DIG. 11
[58] Field of Search ........................ 52/122, 63, 80, 83, 52/222, 745, 747; 261/109, 108, 111, DIG. 11; 135/1 D, 3 C, 8

[56] References Cited

U.S. PATENT DOCUMENTS

| | | | |
|---|---|---|---|
| 3,945,106 | 3/1976 | Mayr et al. | 135/1 D X |
| 3,994,108 | 11/1976 | Johnson | 261/DIG. 11 |
| 4,010,580 | 3/1977 | Mayr et al. | 52/80 |
| 4,050,214 | 9/1977 | Johnson | 52/745 |
| 4,106,244 | 8/1978 | Kessler et al. | 52/63 |
| 4,148,850 | 4/1979 | Schulte et al. | 261/109 |

FOREIGN PATENT DOCUMENTS

| | | | |
|---|---|---|---|
| 2232399 | 1/1974 | Fed. Rep. of Germany | 261/DIG. 11 |
| 2400313 | 8/1975 | Fed. Rep. of Germany | 261/DIG. 11 |

*Primary Examiner*—J. Karl Bell
*Attorney, Agent, or Firm*—Spencer & Kaye

[57] ABSTRACT

A cooling tower including a jacket composed of a non-self-supporting shell, a spacer ring and a ground support between which the shell is stretched, a mast composed at least in part of a metallic material, a main lifting ring attached to the mast, and cables connected between the spacer ring and the main lifting ring for supporting the spacer via the main lifting ring, is further provided with an auxiliary lifting ring attached to the mast, and the mast, the main lifting ring and the auxiliary lifting ring are each provided with a row of spaced bores, with the bores of each lifting ring being located adjacent the respective bores of the mast, and the bores of the mast extending at regular intervals from the top of the mast and over a significant portion of its height.

20 Claims, 7 Drawing Figures

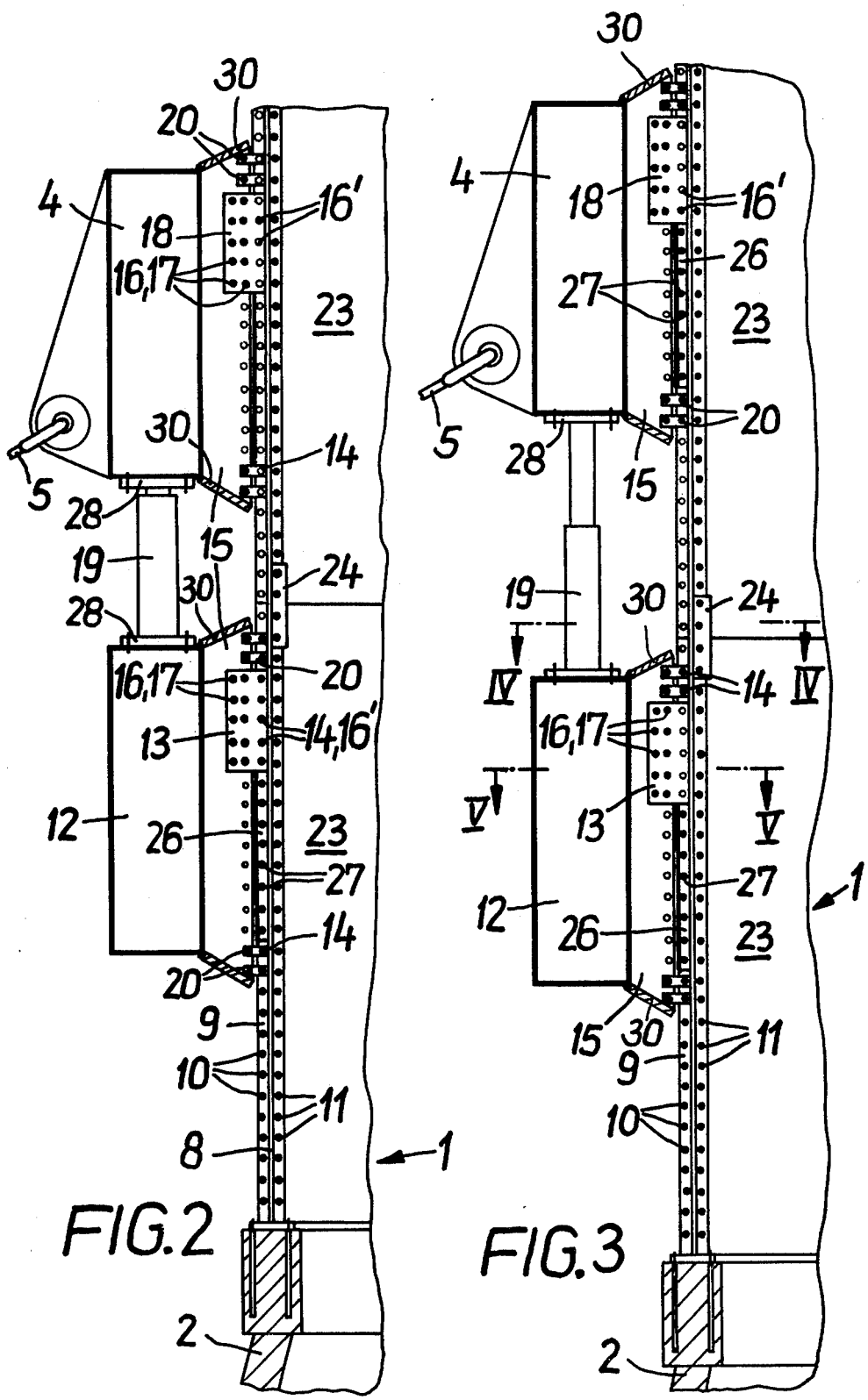

COOLING TOWER

BACKGROUND OF THE INVENTION

The present invention relates to a cooling tower of the type including a jacket which consists of a shell which is not self-supporting and is stretched between a spacer ring and a footing, wherein the spacer ring is held by means of cables via a lifting ring attached at a mast which is made of least partially of a metallic material. The invention further relates to a method for assembling such a cooling tower.

The erection, or assembly, of known cooling towers having this type of construction, especially those of considerable size, frequently causes considerable difficulties. The jacket of such a cooling tower is gradually assembled on the ground at the building site and is then pulled upwardly from the tip of the finished or simultaneously progressing mast. In case the jacket is pulled upwardly from the tip of the finished mast, long cables, lever systems, or the like are required for this operation, whereas simultaneous erection of the mast and jacket results in even greater difficulties due to the concomitant additional pressure stresses during the joining of the mast sections.

SUMMARY OF THE INVENTION

It is therefore an object of the present invention to provide a cooling tower structure which can be erected in as simple and safe a manner as possible.

A further object of the invention is to provide a cooling tower permitting simple disassembly in the reverse order of its assembly.

Another object of the invention is to eliminate the need for additional tensioning members and the difficult steps of mounting and manipulating such members at the tip of the mast during erection of the cooling tower.

These and other objects are achieved, according to the present invention, in a cooling tower including a jacket composed of a non-self-supporting shell, a spacer ring and a ground support between which the shell is stretched, a mast composed at least in part of a metallic material, a main lifting ring attached to the mast, and cables connected between the spacer ring and the main lifting ring for supporting the spacer ring via the main lifting ring, by the provision of an auxiliary lifting ring attached to the mast, and by providing the mast, the main lifting ring and the auxiliary lifting ring with a row of spaced bores, with the bores of each lifting ring being located adjacent respective bores of the mast, and the bores of the mast extending at regular intervals from the tip of the mast and over a significant portion of its height.

In preferred embodiments of the invention, the portion of the mast provided with bores has a uniform diameter and the height of this portion is at least as great as the distance between the mast footing, and the spacer ring when the latter is at its final position, and the remaining, base, region of the mast, below that portion, diverges, or broadens, downwardly. This structural arrangement provides high structural stability rendering the mast earthquake-proof and eliminates the need for special lifting devices for raising the spacer ring.

According to a particularly advantageous feature of the invention, the main lifting ring, when it reaches the top of the mast, is additionally secured to the mast via the auxiliary lifting ring in that the latter is secured to the mast by connectors held in the associated bores. This provides increased structural security in a simple manner.

The objects according to the invention are further achieved by erecting the cooling tower by disposing the auxiliary lifting ring below the main lifting ring, disposing lifting elements between the main lifting ring and the auxiliary lifting ring, successively connecting each lifting ring in turn to the mast by introducing plug-in elements into the associated bores, and disconnecting the other of the lifting rings from the mast and operating the lifting elements to raise that lifting ring which is presently disconnected from the mast between such successive connections, whereby the lifting rings are raised alternatingly.

BRIEF DESCRIPTION OF THE DRAWING

FIG. 2 is a cross-sectional, elevational detail view of a portion of the mast wall of FIG. 1 with the lifting ring and auxiliary lifting ring being attached.

FIG. 3 is a view similar to that of FIG. 2 showing a different position of the rings.

DESCRIPTION OF THE PREFERRED EMBODIMENTS

Figure 1:
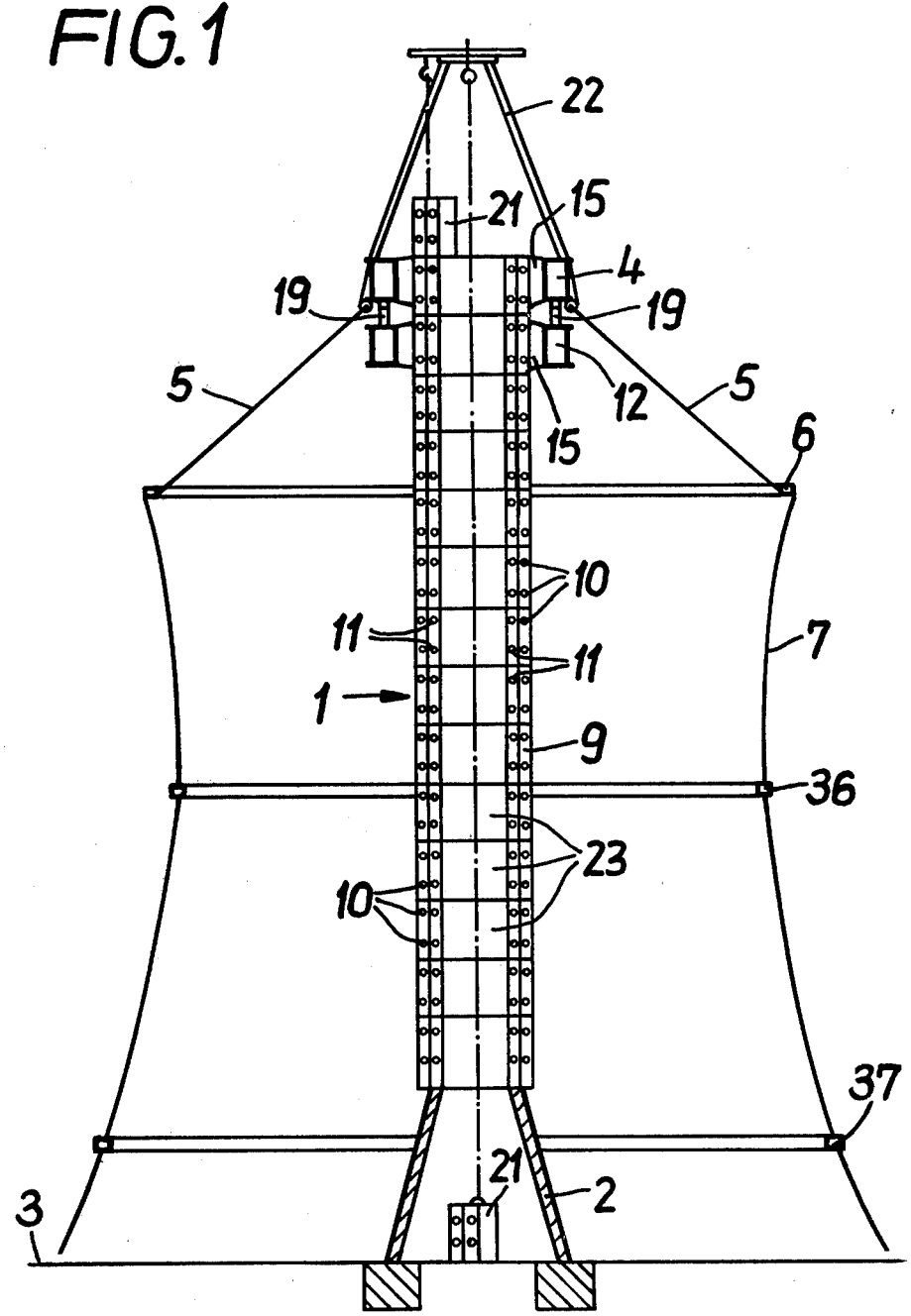
FIG. 1 is an elevational, cross-sectional view through the axis of a cooling tower according to a preferred embodiment of the invention.

The cooling tower illustrated in FIG. 1 consists of a mast 1 having essentially a round cross section. This mast is supported on the ground 3 by way of an upwardly tapering conical base 2 of reinforced concrete resting on a footing, also of reinforced concrete. A lifting ring 4 is attached to the top of the mast 1, this ring holding, via cables 5, a spacer ring 6 to which the cooling tower jacket 7 is attached, the latter being provided with a shell which is not self-supporting.

FIG. 2 shows that the mast 1 is constituted by a wall 8 composed of panels 21 provided at their vertical edges with flange-like rails 9 formed with vertically aligned outer bores 10 and vertically aligned inner bores 11, all of the bores having horizontal axes. Wall 8 is formed of vertically superimposed mast sections 23, each section 23 having the form of a cylinder and being composed of a plurality of panels 21. In each section 23, the rails 9 at adjacent edges of successive panels 21 abut against one another and are joined together by connecting pins or bolts inserted through at least bores 11. The joint between two such panels of a section 23 is shown most clearly in FIG. 5. In an assembled mast, the rails 9 of successive sections 23 are in alignment with one another and form supporting ribs or the like. Bores 10 are spaced at regular intervals over a significant portion of the height of the mast, from the tip thereof, and particularly extend over substantially the entire mast height, down to base 2. The diameter of the mast is uniform, or constant over the portion of its height which is coextensive with bores 10 and the extent of that height portion is preferably at least as great as the vertical distance between the top of base 2 and spacer ring 6 when the latter is at its final height. Only the superimposed outer bores 10 are used for attaching the lifting ring 4 and an auxiliary lifting ring 12. Rails 9 of successive mast sections are vertically aligned with one another over the height of the mast. The procedure of lifting the jacket 7 by means of the lifting ring 4 takes place as follows.

The auxiliary lifting ring 12 is connected with the aid of fishplates 13, via bores 16', to the rails 9 by way of several of the bores 10 with the use of plug-in elements 14 in the form of connecting pins. The rails 9 are uniformly distributed around the circumference of the mast wall 8. The auxiliary lifting ring 12 and the lifting ring 4 are provided with brackets 15 located opposite to rails 9. These brackets are provided with bores 16 disposed opposite bores 10. By way of these bores 16 the brackets 15 are connected to the fishplates 13 by means of pins 17 extending through bores 16 and corresponding bores in fishplates 13. In a corresponding fashion, the lifting ring 4 is connected above the auxiliary lifting ring 12 to the rails 9 by way of fishplates 18.

Several hydraulic power cylinders 19 are inserted between the lifting ring 4 and the auxiliary lifting ring 12 in uniform distribution around the circumference of mast 1 to constitute lifting elements. Cylinders 19 are secured to the rings via respective supporting plates 28. After all fishplates 18 have been disconnected from the rails 9 by removal of the associated pins 14, the pistons of the hydraulic power cylinders 19 are almost completely extended, namely into a position wherein bores 16' of the fishplates 18 are in alignment with higher bores 10 of the rails 9. Thereafter, these bores are provided with connecting pins 14 to attach the lifting ring 4 to rails 9. This position is illustrated in FIG. 3. After the lifting ring 4 has thus been attached, the auxiliary lifting ring 12 is detached from its connection to the rails 9 and lifted by retracting the pistons of the hydraulic power cylinders 19. Then, the auxiliary lifting ring 12 is once again attached to the rails 9, and the lifting ring 4 is detached therefrom for the subsequent stroke. In this way, the lifting ring 4 "climbs" up the mast 1, entraining the jacket 7.

The connecting pins 14 can be omitted if, underneath the fishplates 13 and/or 18 on each side of the rails 9, respectively, one prop 26 is attached by means of pins 27. The fishplates would then be supported on these props only as shown in FIG. 3. In the position as illustrated in FIG. 2 the props 26 corresponding to fishplates 18 are removed before lifting the lifting ring 4 to avoid hindering of the lifting step.

In FIGS. 2 and 3 for the purpose of clarity each of the bores 10, 11, 16 or 16' which is provided with a pin or bolt is shown as a marked point.

Additionally, at the bottom and at the top of the brackets 15, respectively, two pairs of coupling plates 20, provided with only two bores each, are utilized which absorb only the longitudinal forces from the force couple of the shifting moment and which do not absorb any uncontrolled transverse forces. The bores of these coupling plates, cooperating with the bores 10 of the rails 9, permit the connecting pins to be "threaded" more easily.

To reduce the friction between the mutually facing surfaces of the fishplates 13 and 18, on the one hand, and the rails 9, on the other hand, during the climbing operation, these surfaces of the fishplates are provided with slideways. The upper supporting plates 28, on rings 4, are joined to the piston rods of the hydraulic power cylinders 19 by way of ball joints so that, in case of an oblique positioning on account of minor differences in the lifting stroke, there are no compressive forces exerted on the edges.

Figure 4:
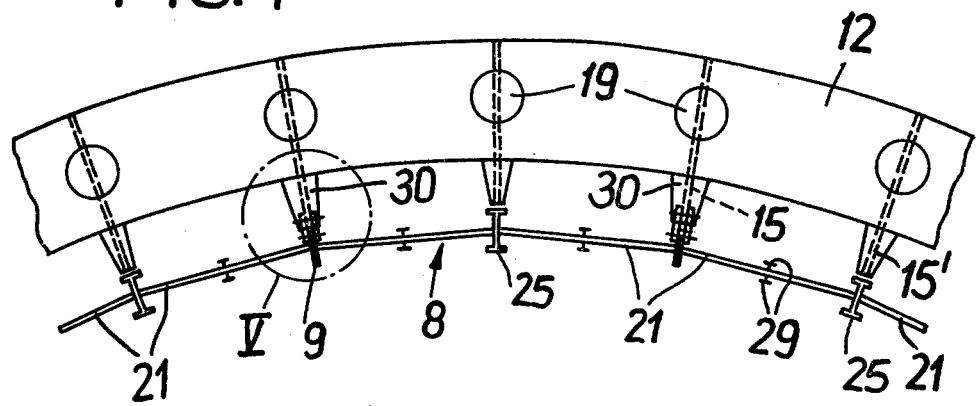
FIG. 4 is a cross-sectional view taken along line IV—IV of FIG. 3.
Figure 5:
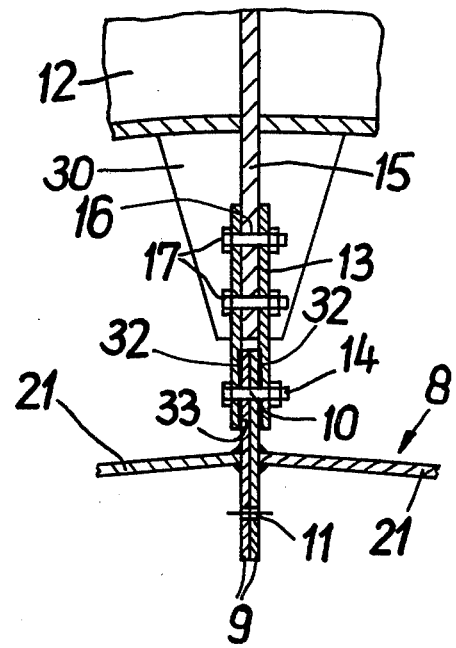
FIG. 5 is a cross-sectional view, to an enlarged scale, along line V—V of FIG. 3 and corresponding to the region enclosed by circle V in FIG. 4.

FIGS. 4 and 5 illustrate that the mast wall 8 is composed of several vertically subdivided panels 21 with laterally adjacent panels being fastened together via the flange-like rails 9 mounted at their ends, bores 11 being utilized for this purpose. If the simultaneous erection of mast and jacket of the cooling tower is intended, then, as can be seen from FIG. 1, the panels 21 can be raised by means of a sawhorse-like, or trestle-like support structure 22 mounted on the lifting ring 4. In this procedure, the panels 21 are initially secured together only by way of the inner bores 11. Only after the auxiliary lifting ring 12 has cleared the outer bores 10 after climbing past them are these bores 10 also provided with bolts. At the assembly seams between the individual mast sections 23, junction fishplates 24 are connected between vertically aligned rails 9, as shown in FIGS. 2 and 3. Similar exterior junction fishplates are mounted via outer bores 10 in each case after the auxiliary lifting ring 12 has been lifted past the associated assembly seam.

Figure 6:
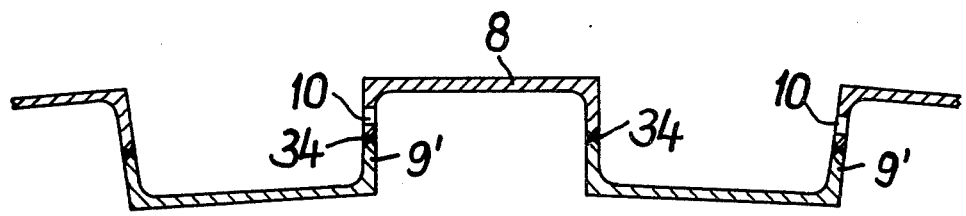
FIG. 6 is a cross-sectional, detail plan view of another embodiment of the mast wall according to the invention.

An alternative embodiment of the mast wall 8 is shown in FIG. 6. In this arrangement, vertically extending U-shaped profile members 9' are arranged side-by-side and welded together so that the mast wall 8 has, as seen in cross section, approximately rectangular corrugations. The flanges of these U-shaped profile members are provided with the bores 10 at regular intervals over the circumference thereof. For purposes of the lifting operation, the brackets 15 of the lifting ring 4 and of the auxiliary lifting ring 12 then come in lateral contact with these flanges. For that purpose the weld seams 34 are grinded off to get a plane contact surface.

Reverting to FIGS. 1–3, at completion of the above-described jacket lifting operation, the lifting ring 4 will have arrived practically in its uppermost position. Thereafter the auxiliary lifting ring 12 is additionally supported on the mast 1 by additional connections, such as brackets, not shown, and additional hydraulic power cylinders are inserted between the two rings. All of the hydraulic power cylinders are then simultaneously extended to produce the additional force required for the final tensioning of the jacket 7. Thereafter the lifting ring 4 is attached in its final position at the tip of the mast 1 with the use of liners and/or further brackets. Usable for this additional mounting are, for example, profiled strips 25 arranged in the vertical center of the panels 21 and illustrated in FIG. 4. A further reinforcement of the lifting ring mounting is made possible by securing the auxiliary lifting ring 12 to the mast 1, on the one hand, and to the lifting ring 4, on the other hand. T-profiled strips 29 which are fixed inside and outside to the panels 21 half the distance between profiled strips 25 and rails 9 serve for stiffening of the panels 21. Each end face of the brackets 15 is provided with a stiffening plate 30 which is joined to an inner edge of one of the lifting rings.

Another mounting possibility resides in attaching merely the auxiliary lifting ring 12 to the mast 1, the lifting ring 4 then being supported thereon by way of liners in place of the lifting elements. This is advantageous if a subsequent additional tensioning of the jacket is contemplated.

To connect additional spacer rings 36 and 37 with the mast 1 by way of spokes, not shown, it is possible to attach fishplates or other connecting elements, which can be joined to these spokes, to the rails 9 by way of the respective bores 10. If the construction is suitable, it is also possible to utilize, as one of these connecting elements, the auxiliary lifting ring 12 after termination of the climbing operation. These connecting elements and/or the auxiliary lifting ring can also be employed optionally for anchoring the mast 1 by means of cables to shorten its buckling length. During the disassembly of the cooling tower, all steps are executed in the reverse order.

As shown in FIG. 5, each fishplate 13 is provided with a slideway 32 presenting a surface having a low coefficient of friction facing the resp. adjacent surface 33 of the rail 9.

Figure 7:
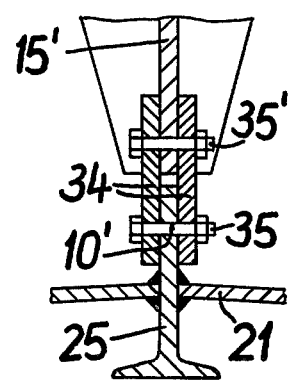
FIG. 7 is a cross-sectional view similar to FIG. 5 but showing a kind of fastening of the lifting ring at the top of the mast.

At the top of the mast 1 the outer flanges of the profiled strips 25 which are of I-shape have been eliminated as illustrated in FIG. 7. Thus it becomes possible to fasten liners 34 to the profiled strips 25 by bolts 35 inserted through bores 10'. This liners 34 are of a fishplate structure and serve for additional fastening of the lifting ring 4 to the mast 1. The lifting ring 4 therefor in these regions is provided with brackets 15' which are similar to brackets 15. The connection is completed by bolts 35' penetrating the liner 34 and the brackets 15' through corresponding bores.

It will be understood that the above description of the present invention is susceptible to various modifications, changes and adaptations, and the same are intended to be comprehended within the meaning and range of equivalents of the appended claims.

What is claimed is:

1. In a cooling tower including a jacket composed of a non-self-supporting shell, a spacer ring and a ground support between which the shell is stretched, a mast composed at least in part of a metallic material, a main lifting ring attached to the mast, and cables connected between the spacer ring and the main lifting ring for supporting the spacer via the main lifting ring, the improvement comprising an auxiliary lifting ring attached to said mast, and wherein said mast, said main lifting ring and said auxiliary lifting ring are each provided with a row of spaced bores, with the bores of each said lifting ring being located adjacent the respective bores of said mast, and the bores of said mast extending at regular intervals from the top of said mast and over a significant portion of its height.

2. An arrangement as defined in claim 1 wherein said mast comprises steel rails forming supporting ribs and in which the bores of said mast are disposed.

3. An arrangement as defined in claim 2 wherein the portion of said mast over which the bores thereof extend is of uniform diameter.

4. An arrangement as defined in claim 3 wherein said mast is supported on a ground footing and consists of said portion over which the bores extend and a base portion which widens downwardly, and wherein the height of said portion over which the bores extend is at least equal to the distance between the ground footing and said spacer ring when the latter is in its final position.

5. An arrangement as defined in claims 2, 3 or 4 wherein said mast is composed of a plurality of sections including flanges via which adjacent sections are connected together, and said rails form parts of said flanges.

6. An arrangement as defined in claim 1 further comprising fishplates associated with each of said lifting rings and provided with bores cooperating with the bores of said lifting rings and of said mast for securing said lifting rings to said mast.

7. An arrangement as defined in claim 6 wherein each said fishplate is provided with a slideway presenting a surface having a low coefficient of friction facing said mast.

8. An arrangement as defined in claim 1 wherein the bores in said mast serve at least in part for anchoring said mast, and further comprising additional spacer rings mounting said jacket and secured to said mast via the bores of said mast.

9. An arrangement as defined in claim 1 further comprising detachable liners and wherein said main lifting ring is fastened at the top of said mast via the bores of said mast and said liners.

10. An arrangement as defined in claim 1 wherein said auxiliary lifting ring is fastened near the top of said mast via the bores of said mast and said main lifting ring is secured at the top of said mast by said auxiliary lifting ring.

11. An arrangement as defined in claims 2, 3, 4, 6, 7, 8, 9 or 10 wherein said mast is constituted by a wall composed of sections having the form of approximately rectangular corrugations in horizontal cross section.

12. An arrangement as defined in claim 1 wherein the portion of said mast over which the bores thereof extend is of uniform diameter.

13. An arrangement as defined in claim 12 wherein said mast is supported on a ground footing and consists of said portion over which the bores extend and a base portion which widens downwardly, and wherein the height of said portion over which the bores extend is at least equal to the distance between the ground footing and said spacer ring when the latter is in its final position.

14. An arrangement as defined in claims 12 or 13 wherein said mast is composed of a plurality of sections including flanges via which adjacent sections are connected together, and said rails form parts of said flanges.

15. An arrangement as defined in claims 12 or 13 wherein said mast is constituted by a wall composed of sections having the form of approximately rectangular corrugations in horizontal cross section.

16. A method for constructing the cooling tower defined in claim 1, comprising disposing the auxiliary lifting ring below the main lifting ring; disposing lifting elements between the main lifting ring and the auxiliary lifting ring; successively connecting each lifting ring in turn to the mast by introducing plug-in elements into the associated bores, and disconnecting the other of the lifting rings from the mast, and operating the lifting elements to raise that lifting ring which is presently disconnected from the mast between such successive connections, whereby the lifting rings are raised alternatingly.

17. A method as defined in claim 16 wherein the main lifting ring is provided with mounting means, and further comprising erecting the mast, with the aid of the mounting means, as said steps of successively connecting and operating the lifting elements are being performed.

18. A method as defined in claims 16 or 17 wherein the mast is composed of a plurality of sections including flanges provided with the bores of the mast, and further comprising connecting adjacent mast sections together by insertion of connecting members through bores in the flanges of adjacent sections after the auxiliary lifting ring has been raised above those bores.

19. A method as defined in claim 18 further comprising, after the lifting rings have been raised to their final height, disposing additional lifting elements between the lifting rings for imparting a final tensioning to the jacket, and connecting the auxiliary lifting means to be supported by the mast.

20. A method as defined in claims 16 or 17 further comprising, after the lifting rings have been raised to their final height, disposing additional lifting elements between the lifting rings for imparting a final tensioning to the jacket, and connecting the auxiliary lifting means to be supported by the mast.

* * * * *